United States Patent [19]

Motoda

[11] Patent Number: 5,449,398
[45] Date of Patent: Sep. 12, 1995

[54] METHODS FOR DECHLORYNATION DISPOSAL OF POLYVINYL CHLORIDE WASTES AND APPARATUS THEREOF

[75] Inventor: Kenro Motoda, Tokyo, Japan

[73] Assignee: Motoda Electronics Co., Ltd., Japan

[21] Appl. No.: 213,540

[22] Filed: Mar. 16, 1994

[30] Foreign Application Priority Data

Mar. 16, 1993 [JP] Japan .................. 5-080282

[51] Int. Cl.[6] .................. B01D 47/02; B01D 53/14
[52] U.S. Cl. .................. 95/175; 95/182; 95/223; 95/233; 55/256; 423/240 R
[58] Field of Search .................. 95/172, 175, 223, 233, 95/235; 55/220, 223, 256; 423/240 R

[56] References Cited

U.S. PATENT DOCUMENTS

| 177,580 | 5/1876 | Solvay | 95/223 |
|---|---|---|---|
| 979,210 | 12/1910 | Serrell | 55/223 X |
| 1,289,797 | 12/1918 | Johnson | 55/256 X |
| 2,127,571 | 8/1938 | Pardee, Jr. | 55/223 X |
| 3,504,481 | 4/1970 | Zakarian et al. | 55/223 X |
| 3,520,113 | 7/1970 | Stokes | 55/223 |
| 3,789,109 | 1/1974 | Lyon et al. | 55/223 X |
| 3,799,076 | 3/1974 | Graves | 55/223 X |
| 3,807,138 | 4/1974 | Bellisio | 95/223 X |
| 4,147,756 | 4/1979 | Dahlstrom et al. | 95/223 X |
| 4,251,486 | 2/1981 | Sohda | 55/223 X |
| 4,612,174 | 9/1986 | Fabian et al. | 95/223 X |
| 4,880,445 | 11/1989 | Watten | 95/223 X |
| 5,078,759 | 1/1992 | Kira | 55/256 X |
| 5,143,527 | 9/1992 | Tian-Song | 55/256 X |

FOREIGN PATENT DOCUMENTS

| 0337910 | 10/1989 | European Pat. Off. | 95/233 |
|---|---|---|---|
| 1041199 | 10/1958 | Germany | 95/223 |
| 63-003040 | 1/1988 | Japan . | |
| 0103566 | 2/1917 | United Kingdom | 55/256 |

*Primary Examiner*—Robert Spitzer
*Attorney, Agent, or Firm*—Rogers & Killeen

[57] ABSTRACT

The present invention provides methods for making gases generated in the treatment of hydrogen chloride wastes harmless by neutralization and dissolving, and an apparatus thereof, and a suction-type solution filter container to be used, and providing to shape useful materials or components, such as activated carbon with excellent adsorbability, from the post-treated residues of the wastes. Hydrogen chloride wastes are put in the sealed container 1 and heated at 400° C. or less without oxygen or with air-blocked condition; the gases from the wastes, such as chlorine or hydrogen chloride, are sucked to extract from the container; the extracted gases are introduced into the suction-type solution filter container with liquid filtration agents to pass therethrough; chlorine is removed and reduced in volume from the wastes in the sealed container.

13 Claims, 1 Drawing Sheet

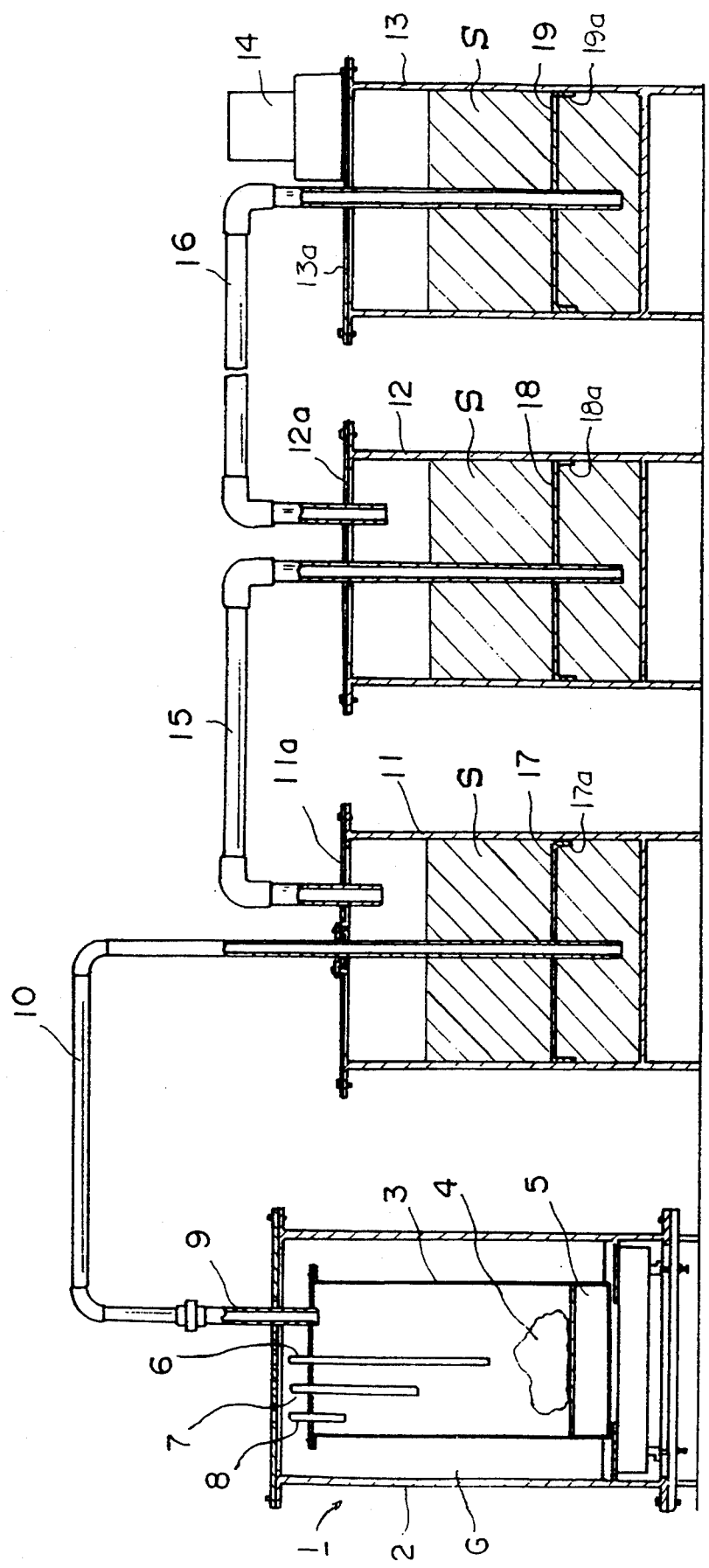

METHODS FOR DECHLORYNATION DISPOSAL OF POLYVINYL CHLORIDE WASTES AND APPARATUS THEREOF

FIELD OF THE INVENTION

This invention relates to methods for making noxious gases harmless and odorless after neutralization or dissolving and to an apparatus thereof, when the gases are generated in the disposal of wastes, such as polyvinyl chloride films and sheets; and this invention relates to a suction-type solution filter container used thereby, and methods for forming carbon materials, such as an activated carbon with excellent absorbability from the residue after heat-treating the disposal as described, or for salvaging the disposal as a tar component, or methods for forming civil engineering and building materials after drying and setting the tar component, without leaving any disposal residues.

BACKGROUND OF THE INVENTION

Polyvinyl chloride films applied to agricultural or horticultural vinyl houses ere used for a fixed period, and then replaced with a new one because of the deterioration of optical transmission or serviceability with age or by dust adhesion.

As a result, used polyvinyl chloride films arise, and it is necessary to dispose of them with a certain method. If the used films are beat-treated with an ordinary refuse incinerator under the air (oxygen) atmosphere, the incineration temperature rises higher with the generation of noxious gases, such as a hydrogen chloride gas and dioxins (popularly known as chlorodibenzoxines), and of a malodor, so that the refuse incinerator will be damaged, or pollutions will be caused. Therefore, the heat treatment is seldom practiced.

Another methods including a method for extracting the oils from polyvinyl chloride to be salvaged, or for throwing the used films into reclaimed land without any treatment; the former, however, causes problems with salvage costs and efficiency, the latter makes the land loose and destroy the natural circulating system; therefore, these are not excellent methods.

Thus, it is suggested that the waste plastic materials including chloric polymer compounds, such as polyvinyl chloride, should be treated making generated gases, such as hydrogen chloride gases, harmless. In Japanese Provisional Publication No. 3040 of 1988, for example, a fusing-setting method was provided for heating and fusing waste plastic materials at pyrolysis temperature of at least 150° C. or more with crushing and kneading, while calcium salts were introduced, so that the harmful hydrogen chloride gases generated would be harmless by the salts. This method conducted under the air atmosphere (oxygen), however, has a potential for generating harmful materials to the human body and a danger to ignition. Moreover, this method needs to dispose of the solid waste plastic materials.

SUMMARY OF THE INVENTION

The present invention provides methods for making harmless, the gases generated in the treatment of polyvinyl chloride wastes, and an apparatus thereof, providing a suction-type solution filter container used thereby, and creating useful substances or materials, such as activated carbon from the residues after heating of the waste, as described, with excellent adsorbability, in the light of the waste disposal or polyvinyl chloride generating harmful hydrogen chloride gases under present condition in the conventional arts.

In order to overcome the object as described, the present invention provides a disposal method, mainly comprising: putting polyvinyl chloride wastes into a sealed container to evacuate oxygen or stop the air therein to heat the wastes at 400° C. or less; absorbing and extracting gases generated from the wastes by the heat, such as chlorine and hydrogen chloride, from the container; introducing the extracted gases into the suction-type solution filter container including a liquid filtration agents to pass the gases through the agents; and removing chlorine from the wastes in the sealed container with volume loss.

In order to carry out the methods as described, the present invention provides an apparatus, mainly comprising: a sealed heat container capable of including polyvinyl wastes and of heating the wastes to a required temperature under oxygen evacuation or air-stopped conditions; a suction-type solution filter container which includes liquid filtration agents leaving space to an upper side, applying absorptivity to gases collecting the upper side space after treatments, such as dissolution and neutralization, through the filtration agents, wherein an end of a gas introduction pipe is connected to the sealed heat container and located in the filtration agent; and a suction fan device provided by continuous connection through the upper space of the solution filter container.

The methods of the present invention can neutralize or dissolve noxious gases generated In the treatment of polyvinyl chloride wastes, such as chlorine and hydrogen chloride, in the suction-type solution filter container, to achieve harmlessness and odorlessness; and the methods can change the post-heating residues of the wastes into useful materials with excellent adsorbability, for example, after re-heating disposal at higher temperature.

BRIEF SUMMARY OF THE INVENTION

FIG. 1 illustrates a front view in necessary section of an apparatus as an embodiment of the harmless disposal methods for polyvinyl chloride wastes according to the present invention.

DETAILED DESCRIPTION OF THE PREFERRED EMBODIMENTS

Now, embodiments of the present invention will be described, referring to FIG. 1. FIG. 1 illustrates a front view in necessary section of an apparatus as an embodiment of the harmless disposal methods for polyvinyl chloride wastes according to the present invention.

In FIG. 1, the numeral 1 shows a sealed container for including polyvinyl wastes inside to heat; the numeral 2 shows an outer container of the sealed container 1; and the numeral 3 shows an inner container thereof. The outer container 2 is sealed with the inner container 3 in insulation. The inner container 3 contains polyvinyl chloride wastes 4 (sometimes called "disposal objects", hereunder) evacuating the gases in the surplus space to the outside to remove oxygen from the Inside of the inner container 3. The inner container 3 also blocks the interchange with the outer air.

The numeral 5 shows a heat means set on the lower side of the inner container. The heat means 5 heats the inner container 3 at less than 400° C., preferably at 350° C. or less, to pyrolytically decompose polyvinyl chloride wastes 4 by heating and fusing. The heat means 5 is an electrical heater herein; however, an exhausted heat means for the combustive treatment of wastes also may be used; alternatively, a heat means by far infrared rays and an electrical heater or any electromagnetic wave means, such as high-frequency induction heater and magnetrons, or an optional combination of these means may be used.

The numeral 6 shows a first temperature sensor. The numeral 7 shows a second temperature sensor. The numeral 8 shows a third temperature sensor. Each sensor detects the internal temperature of the inner container 3, respectively at the backmost, the center or the front points of the container 3 along the depth.

The heat temperature in the inner container 3 ranges from about 150°–240° C. to 350° C. approximately lower than 400° C., and the heat temperature is directed to change step by step on time schedule in respect of the gases to be generated from disposal objects 4.

Further, the inside pressure of the inner container 3 is reduced by the absorptive action from the side 11, 12, 13 of a suction-type solution filter container as described hereunder; polyvinyl chloride wastes 4 actually can be pyrolytically decomposed at lower temperature than the temperature as described. The lower side of the temperature along the depth of the inner container 3 is higher than the upper, but there is a little difference between the upper and lower sides, because polyvinyl chloride wastes 4 convect by heating and fusing.

The numeral 9 is a gas introduction pipe to connect to the upper side of the inner container 3 in the sealed container 1 for introducing the gas generated in the inner container 3 to the outside of the sealed container 1. The numeral 10 is a connecting pipe connected to the introduction pipe 9 to introduce the generated gases to the other suction-type solution filter containers 11, 12, 13.

The numeral 11 shows a first suction-type solution filter container including liquid filtration agent therein; the numeral 12 shows a second suction-type solution filter container including liquid filtration agent therein; and the numeral 13 shows a third suction-type solution filter container including liquid filtration agent therein, and a suction device 14 is attached on the upper cover component.

In reference to the apparatus shown in FIG. 1, the first suction-type solution filter container 11 is connected to the inner container 3 through the introduction pipe 9 and the connecting pipe 10, and connected to the second suction-type solution filter 12 through the connecting pipe 15. Moreover, the second suction-type solution filter is connected to the third suction-type solution filter container 13 through the connecting pipe 16.

Although the first, second and third suction-type solution filter containers 11, 12, 13 are serially connected to the inner container 3 in this order, these three containers 11, 12, 13 may be parallelly connected to the inner container 3. In the case of parallel connection, a suction device 14 described hereunder is attached to cover components 11a, 12a, 13a on the upper side of the suction-type solution filter containers 11, 12, 13; however, a larger suction device 14 may be designed to suck the gases in each container simultaneously.

Thus, the front end side of the connecting pipe 10 is hermetically penetrated into the hole formed about the center plane of the upper cover component 11a of the first suction-type solution filter container, while the rear end is immersed in filtration agents S in the filter container 11 and connectively fixed to be located a little higher from the bottom of the container 11. The rear end side of the connecting pipe 15 is hermetically penetrated into a hole formed in the upper cover component 11a of the first suction-type solution filter container 11, end the rear end is arranged to be located in the upper space of the filter container 11; the front end side of the connecting pipe 15 penetrated into a hole about the center plane of the upper cover component 12a of the second suction-type solution filter container 12, while the front end is immersed in filtration agents S in the filter container 12, and connectively fixed to be located a little higher from the bottom of the container 12. Furthermore, the connecting pipe 16 is connected as the way described in the connecting pipe 15, between the second and third suction-type solution filter containers 12, 13.

About 3 quarters of filtration agents S are respectively contained in the first, second and third suction-type solution filter containers, and the surplus space is kept in the upper part of each container. As filtration agents S, the following solutions may be used; water ($H_2O$); surface-active aqueous solution including soap, sodium alkyl benzensulfonic acid, or the like: alkaline solutions including caustic soda (NaOH), caustic potash (KOH). calcium hydroxide ($Ca(OH_2)$), or the like; or oily solutions, such as gas oil, kerosine and turpentine oil. However, caustic soda is used herein. Alternatively, for example, aqueous solutions may be contained in the first, second and third auction-type solution filter containers 11, 12, 13; or aqueous solution may be contained in the first and second suction-type solution filter container 11, 12, while caustic soda is contained in the third suction-type solution filter 13.

Each vapor-liquid mixed plate is attached to the front end side of each connecting pipe 10, 15, 16 located in filtration agents S respectively contained in each suction-type solution filter 11, 12, 13 to be connected so that the gases introduced from each front end to each filtration agent may sufficiently causes catalytic reaction to each filtration agent S. These vapor-liquid mixed plates 17, 18, 19, are provided with plural small permeable holes in a plate component with acid and alkaline resistivities; alternatively a filter with fine meshes may be used. Further, many small permeable holes with about 0.5 mm diameter may be provided with peripheral walls of the front end of the connecting pipe 10, 15, 16 after sealing thereof. Thus, the gases introduced from the front end of each connecting pipe 10, 15, 16 forms bubbles, so that the catalytic reaction with filtration agents S can be promoted together with the effect of the vapor-liquid mixed plates 17, 18, 19.

Two or more vapor-liquid mixed plates 17, 18, 19 may be respectively arranged on the front side of each connecting pipe 10, 15, 16, keeping appropriate intervals to render multi-stages. It is possible to turn the vapor-liquid mixed plates 17, 18, 19, at the side of the front end to promote catalytic reaction of the gases with filtration agents S. If the vapor-liquid plates 17, 18, 19 are directed to turn, the front side of each connecting pipe 10, 15, 16 will be connected to the lower peripheral sides of each first, second and third suction-type solution filter container 11, 12, 13, or connected about the center of the bottom components, because the motors for turning vapor-liquid mixed motor must be attached about the plane center of each upper cover component 11a, 12a, 13a of each suction-type solution filter container 11, 12, 13. If the vapor-liquid mixed plates 17, 18, 19 are desired to turn, downward skirt 17a–19a may be sometimes formed on the periphery of each vapor-liquid mixed plate 17, 18, 19.

In each suction-type solution filter 11, 12, 13, hydrogen chloride (HCl) gas mainly reacts with caustic soda (NaOH) to generate NaCl and $H_2O$. If noxious hydrogen chloride gas is not completely neutralized in the first suction-type solution filter container 11, the non-neutral gas will be neutralized in the second suction-type solution filter container 12, and if noxious hydrogen chloride gas is not completely neutralized in the second suction-type solution filter container 12, the non-neutral gas will be neutralized in the third suction-type solution filter container 13; the noxious hydrogen chloride gas, therefore, can be almost completely neutralized to be harmless. The number and volume of the suction-type solution filter containers 11, 12, 13 for serial connection is determined according to the size of the inner container 3 in the sealed container 1. If suction-type solution filter containers 11, 12, 13 are used one by one, a container with a certain large volume is used for the filter container. Filtration agents S in each suction-type solution filter container 11, 12, 13 should be replaced with a new alkaline solution after every treatment. When an aqueous solution is used for filtration agents, the solution with noxious gases, such as chlorine and hydrogen chloride gases, is treated by neutralization or the like with another apparatus for harmlessness.

If plural suction-type solution filter containers 11, 12, 13 are parallelly connected to the sealed container 1, after different filtration agents S are contained in each suction-type solution filter 11, 12, 13, and after heat temperature by the heat means 5 is adjusted, for example, while the generated gases are extracted step by step keeping appropriate periods, the generated gases can be introduced to the different suction type solution filter container 11, 12, 13 by a switch valve according to the kinds of the generated gas. For example, sulfur dioxide ($SO_2$) introduces the generated gases into the suction-type solution filter container including calcium hydroxide ($Ca(OH_2)$) solution; hydrogen chloride gas introduces the generated gases into the suction-type solution filter container including an aqueous or caustic soda solution; and chlorine gas introduces the generated gases into the suction-type solution filter container including calcium hydroxide ($Ca(OH_2)$) or aqueous solution.

Moreover, an alkaline solution and water can be enclosed with polyvinyl wastes 4 in the inner container 3 in the sealed container 1 in advance, as well as the serial or parallel suction-type solution filter container 11, 12, 13 as described. In this case, polyvinyl chloride wastes 4 are heated, fused and pyrolytically decomposed, while the gases, such as chlorine and hydrogen chloride, are neutralized; less noxious gases can be generated; the noxious gases can be harmless with the effect of suction type solution filter containers 11, 12, 13.

Black residues are left in the inner container 3 in the sealed container 1 after the heat-treating of polyvinyl chloride wastes 4. The residues are presumed to be insoluble polymer materials generated as follows: After a side chain of polyvinyl chloride is dropped out, and after the polyvinyl chloride has a polyene structure, these polyene structures crosslinks each other or cause cyclarization. The residues of insoluble polymer materials has been almost completely harmless by the chloride removal method of the present invention; the residues have no potential to destroy the environment, even if thrown into land as they are. However, the present invention provides an improved disposal method for reheating these insoluble polymer materials with addition of steam at 700°–800° C.; in this method, we could confirm that activated carbon, which shows the extreme adsorbability can be obtained after the polymer materials are activated.

In fact, 300 g of vinyl chloride sheet was tested for the content of chloride which is included in the black residues left after the treatment by the method according to the present invention; the content was 152 mg. The test was carried out with nitric acid extraction and silver nitrate titration (Cl conversion) at Environment Management Center Inc. 300 g vinyl chloride sheet includes 30% weight of plasticized agents and 70% weight (210 g) of polyvinyl chloride with 60% (125 g) of chlorine; however, the Cl quantity of the black residues treated by the present methods was 125 mg by weight, and it can be said the residues almost completely harmless.

Therefore, the black residues left after the treatment of polyvinyl chloride according to the present invention little includes chlorine; for example, black coal can be obtained after combustion of the black residues under oxygen or the air, as post-treatment.

Further the black residues left in the inner container 3 in the sealed container 1 may be reheated at 400°–500° C., and the tar (or oil) component are vaporized to pass the suction-type solution filter container 11 to salvage in safe or harmless. The salvaging of the tar (or oil) component may be directly carried out, after the sealed container 1 is reheated followed by temperature drop to extract the tar (or oil) component therein.

Moreover, solid materials with optional formation for civil engineering or for construction can be shaped by heating, softening and molding the black residues left after the process of the present invention, or by heating and molding the tar (or oil) component salvaged.

As described hereabove, when caustic soda solution is used for filtration agents S, the noxious gases generated from polyvinyl chloride wastes treated in the sealed container 1, such as chlorine or hydrogen chloride gas, can be almost completely into harmlessness, according to the the present invention. When an aqueous solution is used for filtration agents S, though depending on the temperature of the solution, noxious gases, such as chlorine and hydrogen chloride, can be considerably dissolved into the solution at ordinary temperature.

As describe hereabove, in the present invention, noxious hydrogen chloride gases from polyvinyl chloride wastes can be passed through the liquid filtration agents in the suction-type solution filter container to dissolve and neutralize with deodorizing for harmless treatment. Further, as the wastes can be heated, fused and pyrolytically decomposed at 400° C. or less, preferably at 350° C. or less, blocking the air in the sealed even (without oxygen), no noxious materials, such as dioxine which represents oxygen-including aromatic chloride, will not be generated.

Moreover, according to the present invention, while the used polyvinyl chloride enables the removal of chlorine, deodorizing and volume reduction, the black residues presumed as insoluble polymer materials left in the sealed oven have no problem to reheat or burn, because the residues are almost completely harmless; on the contrary, black coal and activated carbon or molded materials thereof can obtained. Furthermore, the residues can be thrown into land without any problems.

What is claimed is:

1. A method for removing chlorine from polyvinyl chloride wastes, comprising the steps of:
   (a) putting polyvinyl chloride wastes into a sealed container;
   (b) heating the wastes at 400° C. or less in the absence of oxygen;
   (c) extracting chlorine and hydrogen chloride gases from the wastes by heating; and
   (d) introducing the extracted gases into a suction solution filter including liquid filtration agents;
   whereby chlorine is removed from the wastes in the sealed container.

2. The method according to claim 1, wherein the filtration agents comprise an alkaline solution.

3. The method according to claim 1 or 2, wherein the step of heating the wastes is accomplished by at least one of the following means: an electric heater, an electric heater with far infrared rays, an oil combustion means, an electromagnetic heating means, a high-frequency induction heating means and a means for applying heat exhausted from the heating of the polyvinyl chloride wastes.

4. The method according to claim 1 or 2, further comprising the step of heating a residue in the sealed container that remains after extraction of the gases to about 700°–800° C. in the presence of steam whereby the residue is changed into activated carbon.

5. The method according to claim 1 or 2, further comprising the step of burning a residue in the sealed container that remains after extraction of the gases in the presence of oxygen whereby the residue is changed into carbon (black coal).

6. The method of claim 1 further comprising the steps of: heating a residue in the sealed container that remains after the gases have been extracted at 400°–500° C. to vaporize a tar component from the residue; passing the vaporized tar component through the suction solution filter, or dropping the temperature in the sealed container; and salvaging the tar component as oil.

7. The method according to claim 1, 2 or 6, wherein two or more of the suction solution filters are serially connected for passing the gases through filtration agents in each of the filters.

8. A method for treating polyvinyl chloride wastes, comprising the steps of:
   (a) switchably connecting plural suction solution filters to a sealed container for heating polyvinyl chloride wastes therein, each of the filters containing a different filtration agent for filtering a different gas;
   (b) selectively heating the polyvinyl chloride wastes in the sealed container to one of plural predetermined temperatures selected to extract a different gas at each of the predetermined temperatures; and
   (c) selectively switching the filters to the sealed container responsive to the gas being extracted from the wastes.

9. The method according to claim 1, 2, 6 or 8, wherein the filtration agents in the suction solution filters are aqueous solutions selected from the group consisting of water, surface-active agents and alcohol, alkaline solutions and oily solutions.

10. A system for removing chlorine from polyvinyl chloride wastes, comprising:
   a sealed container for heating polyvinyl chloride wastes in the absence of oxygen, the sealed container comprising an inner and outer wall with an evacuated insulative space therebetween, and a platform inside said inner wall for holding the wastes in the absence of oxygen;
   means for selectively heating the wastes to a predetermined temperature between 150° C. and 350° C.;
   a vent extending inside said inner wall for extracting gases from the wastes when the wastes have been heated; and
   plural suction solution filters for receiving the gases from said vent, said filters containing liquid filtration agents for removing the gases extracted from the wastes in said sealed container.

11. The system of claim 10 further comprising plural temperature probes for measuring temperature inside said inner wall at plural predetermined distances from said platform, said probes being connected to said means for heating whereby the temperature inside said inner wall may be controlled.

12. The system of claim 11 wherein said plural filters are switchably connected to said sealed container so that gases from the wastes may be selectively provided to one or more of said plural filters.

13. The system of claim 12 wherein said filtration agents in said plural filters are different and selected to remove predetermined ones of the gases extracted from the wastes, whereby the temperature inside said inner wall may be selected to extract a predetermined gas from the wastes and a predetermined one of said filters may be selected to remove the predetermined gas.

* * * * *